United States Patent [19]

Janke et al.

[11] Patent Number: 5,501,636

[45] Date of Patent: Mar. 26, 1996

[54] ROTARY MACHINE SYSTEM HAVING HOLLOW TUBE SHAFT AND PLURAL OUTPUT SHAFTS

[75] Inventors: Jeffrey S. Janke; Ronald L. Parkins, both of Oregon, Ill.

[73] Assignee: Woods Equipment Corporation, Oregon, Ill.

[21] Appl. No.: 179,164

[22] Filed: Jan. 10, 1994

[51] Int. Cl.⁶ .............................. F16D 7/02; F16H 37/06
[52] U.S. Cl. .............................. 464/48; 74/417; 74/665 F
[58] Field of Search .................. 464/48, 45, 30, 464/46, 47, 97, 183, 178; 74/665 G, 665 B, 665 H, 665 K, 665 F, 417

[56] References Cited

U.S. PATENT DOCUMENTS

| | | | |
|---|---|---|---|
| 2,540,997 | 3/1948 | Schmitter | 464/48 |
| 3,550,727 | 11/1968 | McCain | 188/82.9 |
| 4,216,925 | 8/1980 | Mendiberri | 244/60 |
| 4,502,347 | 3/1985 | Norris et al. | 74/447 |
| 4,586,219 | 5/1986 | Blach et al. | 74/410 |
| 5,233,886 | 8/1993 | Bossler, Jr. | 74/665 F |
| 5,247,856 | 9/1993 | Cuypers | 74/663 F |
| 5,249,995 | 10/1993 | Meisenburg et al. | 440/81 |

FOREIGN PATENT DOCUMENTS 857594  8/1981  U.S.S.R. .................. 464/48

OTHER PUBLICATIONS

*Terrell Series K Bevel Gear Drives* product brochure Oct. 9, 1989.
*Schulte Model 1550 and 1060 Rotary Cutter* product brochure Oct. 9, 1989.
*M&W Model PC1530P Rotary Cutter* product brochure Oct. 9, 1989.
*Woods Model MD315 batwing Rotary Cutter* product brochure Dec. 1992.
*Woods batwing Rotary Cutters models B320 B315 B214* product brochure Jan. 1993.

Primary Examiner—Daniel P. Stodola
Assistant Examiner—Eileen A. Dunn
Attorney, Agent, or Firm—Foley & Lardner

[57] ABSTRACT

A rotating machinery system provides flexible clutch configuration. In accordance with a first embodiment, a tubular shaft is rotatable about a first axis and has a hollow core, the tubular shaft having a first end and a second end; a second shaft coaxial with the tubular shaft and rotatable about the first axis and located in the hollow core, the second shaft having an input end and a transfer end; and a clutch assembly coupling the first end of the tubular shaft to the transfer end of the second shaft for rotating the tubular shaft responsive to rotation of the second shaft. In accordance with a second embodiment, there is a rotary machinery system for converting rotation about a first axis to rotation about second and third axes. The system includes an input shaft rotatable about the first axis; a tubular shaft having a hollow core for receiving at least a portion of the input shaft and rotatable about the first axis responsive to rotation of the input shaft; a clutch assembly coupling the input shaft and the tubular shaft; a first output shaft rotatable about the second axis, coupled to the tubular shaft by a first coupling device; and a second output shaft rotatable about the third axis, coupled to the input shaft by second coupling device.

25 Claims, 3 Drawing Sheets

5,501,636

ROTARY MACHINE SYSTEM HAVING HOLLOW TUBE SHAFT AND PLURAL OUTPUT SHAFTS

BACKGROUND OF THE INVENTION

The present invention relates to a rotary machinery system. The present invention more particularly relates to a rotary machinery system having a tubular shaft rotatable about an axis and having a hollow core, a second shaft coaxial with the tubular shaft and rotatable about the axis, at least a portion of the second shaft being located in the hollow core, and engagement means coupling the tubular shaft and the second shaft for rotating the tubular shaft responsive to rotation of the second shaft. The invention further relates to a rotary machinery system having two coaxial inputs, one of the inputs being directly coupled to an output shaft, the other input being coupled through a clutch assembly to an output shaft. The rotary machinery system converts rotation about a first axis to rotation about second and third axes.

Rotary machinery systems are well known. Rotary machinery systems commonly include an input shaft rotatably coupled to one or more output shafts. In operation, the input shaft is rotated by a drive means such as an engine or motor for rotating the input shaft. The one or more output shafts rotate in response to rotation of the input shaft. The input shaft and the one or more output shafts are rotatably coupled by coupling means such as a clutch, a gear system or both.

Some prior art rotary machinery systems have included a gear system for coupling the input and output shafts. Torque from the input shaft is transferred through the gear system to the output shaft. The gear system has included a first gear coupled to the input shaft and a second gear coupled to the output shaft, the first and second gears each having intermeshing teeth for rotating the second gear responsive to the first gear. The first and second gears may be enclosed in a housing, the housing having apertures for receiving the input shaft and the output shaft and being sealed to contain oil or other lubricant. Collectively, the gear system and housing form a gearbox. The side of the gearbox having an aperture for receiving the input shaft is the input end of the gearbox.

Prior art rotary machinery systems have also included clutch systems for coupling the input and output shafts. A clutch system is required to protect the drive means, which drives the input shaft, in the event rotation of the output shaft is stopped. Such a clutch assembly allows the input shaft, and rotating portions of the drive means, to continue rotating while the output shaft is stopped. This prevents damage to the drive means, and allows the drive means to continue to rotate other drive shafts which may be coupled to the drive means.

Prior art rotary machinery systems have required the clutch systems to be physically located between the drive means and the housing containing the gear system, at the input end of the gearbox. Such a location was necessary for separating the input shaft from the gear system and the output shaft.

However, locating the clutch system between the drive means and the gearbox can cause interference between the clutch system and the driving components. When the clutch system is located as in prior art rotary machinery systems, the clutch system can interfere with driving components such as rotating shafts, belts, pulleys, chains, etc. Moreover, to reduce the risk of such interference, considerable space is required between the drive means and the input end of the gearbox. Further, locating the clutch system at the input end of the gearbox has complicated maintenance of the clutch system, including replacing wearable elements of the clutch system, such as clutch plates and friction disks.

Therefore, there is a need in the art for a rotary machinery system which allows more flexible placement of engagement means such as clutch systems between an input shaft and an output shaft. The present invention provides such a rotary machinery system.

Other prior art rotary machinery systems provide more than one output shaft rotating in response to rotation of an input shaft. In some applications it is desirable to have one or more output shafts coupled to the input shaft through a clutch system, and one or more output shafts coupled to the input shafts directly, without a clutch system.

Such prior art rotary machinery systems have required multiple gearboxes and elaborate interconnections to convert rotation about the axis of the input shaft to rotation about the axes of the plurality of output shafts, including a clutch system for only one or some output shafts. Accordingly, there is a further need in the art for a rotary machinery system having clutched and non-clutched outputs in a compact space.

SUMMARY OF THE INVENTION

The present invention provides a rotary machinery system. The rotary machinery system comprises a tubular shaft which is rotatable about a first axis and which has a hollow core. The tubular shaft has a first end and a second end. The rotary machinery system further includes a second shaft coaxial with the tubular shaft and also rotatable about the first axis. At least a portion of the second shaft is preferably located in the hollow core. The second shaft has an input end and a transfer end. The rotary machinery system still further includes engagement means coupling the first end of the tubular shaft to the transfer end of the second shaft for rotating the tubular shaft responsive to rotation of the second shaft.

The invention further provides a rotary machinery system for converting rotation about a first axis to rotation about second, third and fourth axes. The rotary machinery system comprises an input shaft adapted to be rotated about the first axis, a tubular shaft having a hollow core for receiving at least a portion of the input shaft, the tubular shaft also being rotatable about the first axis. The system further comprises a clutch assembly coupling the input shaft and the tubular shaft for transferring torque from the input shaft to the tubular shaft. The system still further comprises a first output shaft rotatable about the second axis, and first coupling means for rotatably coupling the tubular shaft to the first output shaft. The system still further includes a second output shaft rotatable about the third axis, and second coupling means for rotatably coupling the input shaft to the second output shaft. The system still further includes a third output shaft rotatable about the fourth axis, and third coupling means for rotatably coupling the input shaft to the second output shaft.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENTS

Figure 1:
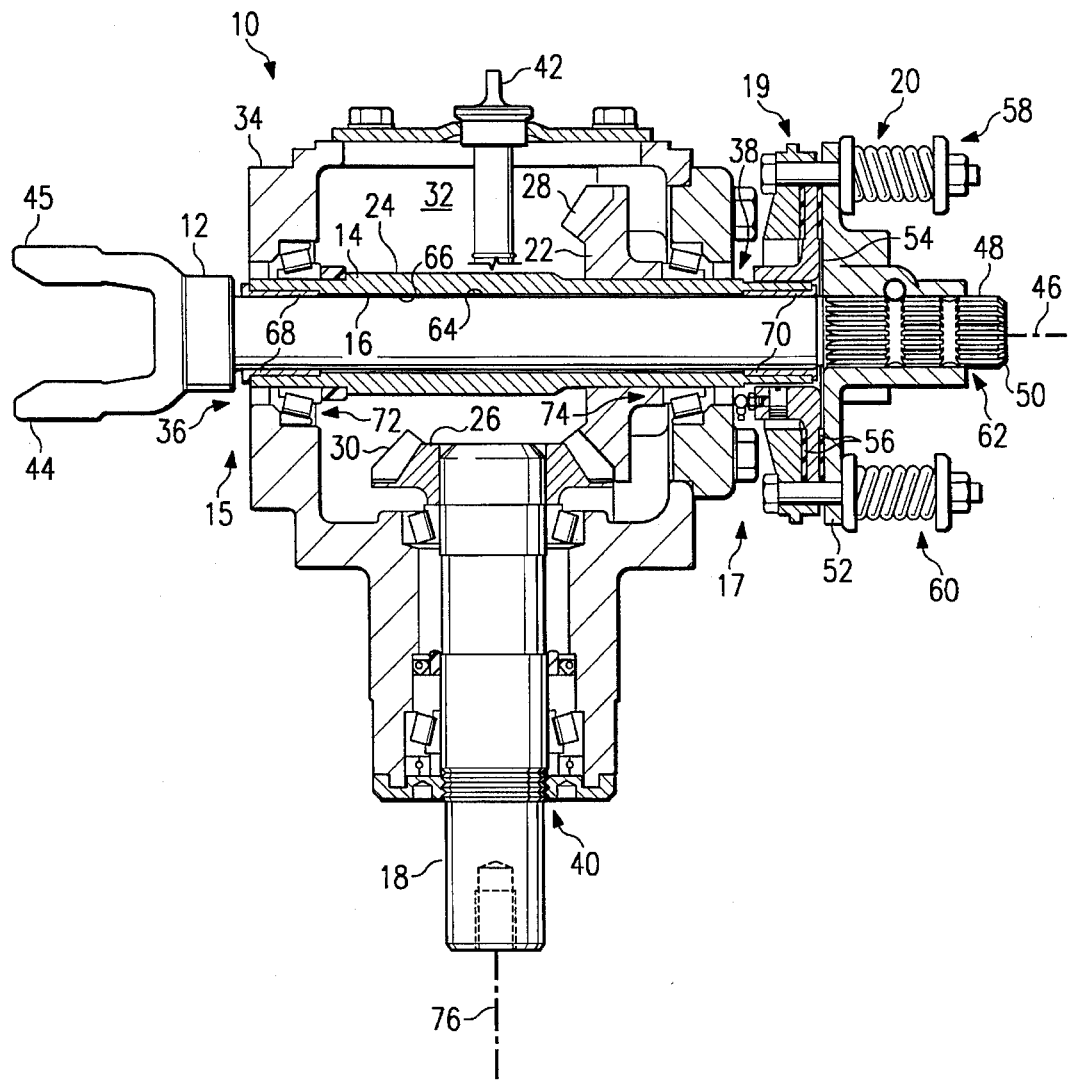
FIG. 1 is a sectional view of a rotary machinery system configured in accordance with a first embodiment of the present invention.

Referring now to FIG. 1, it is a sectional view of a rotary machinery system 10 configured in accordance with a first embodiment of the present invention. The rotary machinery system 10 includes an input shaft 12, a tubular shaft 14 having a hollow core 16, and an output shaft 18. The input shaft 12 and the tubular shaft 14 are coupled by an engagement means such as clutch assembly 20. The engagement means could also comprise a gear system or any other means for transferring torque from the input shaft 12 to the tubular shaft 14. The rotary machinery system further includes a gear system including a first gear 22 coupled to the outer surface 24 of the tubular shaft 14. The gear system further includes a second gear 26 coupled to the end of the output shaft 18. The first gear 22 includes a first set of teeth 28, and the second gear 26 includes a second set of teeth 30, the first set of teeth 28 intermeshing the second set of teeth 30 for rotating the output shaft 18 responsive to rotation of the tubular shaft 14.

The first gear 22 and the second gear 26 are contained in an enclosure 32 formed by a gearbox 34. The gearbox 34 includes a first aperture 36 for receiving a first end 15 of the tubular shaft 14, a second aperture 38 for receiving a second end 17 of the tubular shaft 14, and a third aperture 40 for receiving the output shaft 18. The enclosure 32 preferably contains oil lubricating the gear system, and the gearbox 34 includes a dipstick 42 for monitoring oil level.

The input shaft 12 preferably includes an input yoke 44, which may be coupled to a drive means such as an engine or motor for rotating the input shaft 12 about a first axis 46. Thus, the input yoke 44 forms an input means 45 coupled to the input end of the input shaft and adapted for rotating the input shaft. Opposite the input yoke 44, the input shaft 12 has a transfer end 48 adapted for coupling to the tubular shaft 14. The surface of the transfer end 48 includes a plurality of splines 50.

The clutch assembly 20 includes an outer clutch plate 52, a center clutch plate 54, two friction disks 56, and torque adjustment assemblies 58 and 60. The outer clutch plate 52 includes a plurality of splines 62 for engaging the splines 50 on the outer surface at the transfer end 48 of the input shaft 12 and rotating the outer clutch plate 52 in response to rotation of the input shaft 12. Thus, the outer clutch plate 52 is rotatably coupled to the input shaft 12. The center clutch plate 54 is coupled to the outer surface 24 of the tubular shaft 14 at a second end 17 of the tubular shaft 14, the tubular shaft 14 rotating in response to rotation of the center clutch plate 54. Thus, the clutch assembly 20 forms an engagement means coupling the first end of the tubular shaft to the transfer end of the input shaft for rotating the tubular shaft responsive to rotation of the second shaft.

The clutch assembly 20 preferably forms a slip clutch. As is known in the art, rotation of either the center clutch plate 52 or the outer clutch plate 54 of the clutch assembly 20 is coupled through the friction disk 56 to the other clutch plate, causing rotation of the other clutch plate. Where one shaft is driven and the other shaft is prevented from being driven through the slip clutch, the slip clutch components will slip, allowing the driven shaft to continue rotating, preventing damage to the rotary machinery system. Torque adjustment assemblies 58 and 60 are used to adjust the predetermined torque threshold at which slip occurs, decoupling the input shaft 12 from the tubular shaft 14.

As will be understood by those skilled in the art, the slip clutch forming the clutch assembly 20 could be operationally replaced by other, similar devices, including a friction overload clutch, a friction throwout clutch, an overrunning clutch, and other torque limiters, including combinations thereof, while maintaining the operational advantages of the present invention. As will be further appreciated by those skilled in the art, the relationship between the input shaft 12 and the tubular shaft 14, wherein the input shaft rotates within the hollow core 16 of the tubular shaft 14, could be reversed, with the tubular shaft serving as the input shaft and coupled to an engagement means for transferring torque from the input shaft to a shaft rotating in the hollow core of the input shaft. Such substitutions still provide the operational advantages of the present invention.

The input shaft 12 has an outer surface 64. The outer surface 64 is separated from the inner surface 66 of the tubular shaft 14 by bearings 68 and 70. The outer surface 24 of the tubular shaft 14 is separated from the gearbox 34 by bearings 72 and 74. Thus, the tubular shaft 14 is rotatable about the first axis 46, and the input shaft 12 is coaxial with the tubular shaft 14 and rotatable about the first axis 46. The bearings 68, 70, 72 and 74 prevent damage from relative motion of the input shaft 12, the tubular shaft 14 and the gearbox 34.

In operation, torque applied at the input yoke 44 is transferred through the input shaft 12 to the clutch assembly 20. Torque is further transferred from the outer clutch plate 52 to the center clutch plate 54 through the friction disk 56 to the tubular shaft 14. The first gear 22 rotates with the tubular shaft 14, causing the second gear 26 and the output shaft 18 to rotate about a second axis 76.

Figure 2:
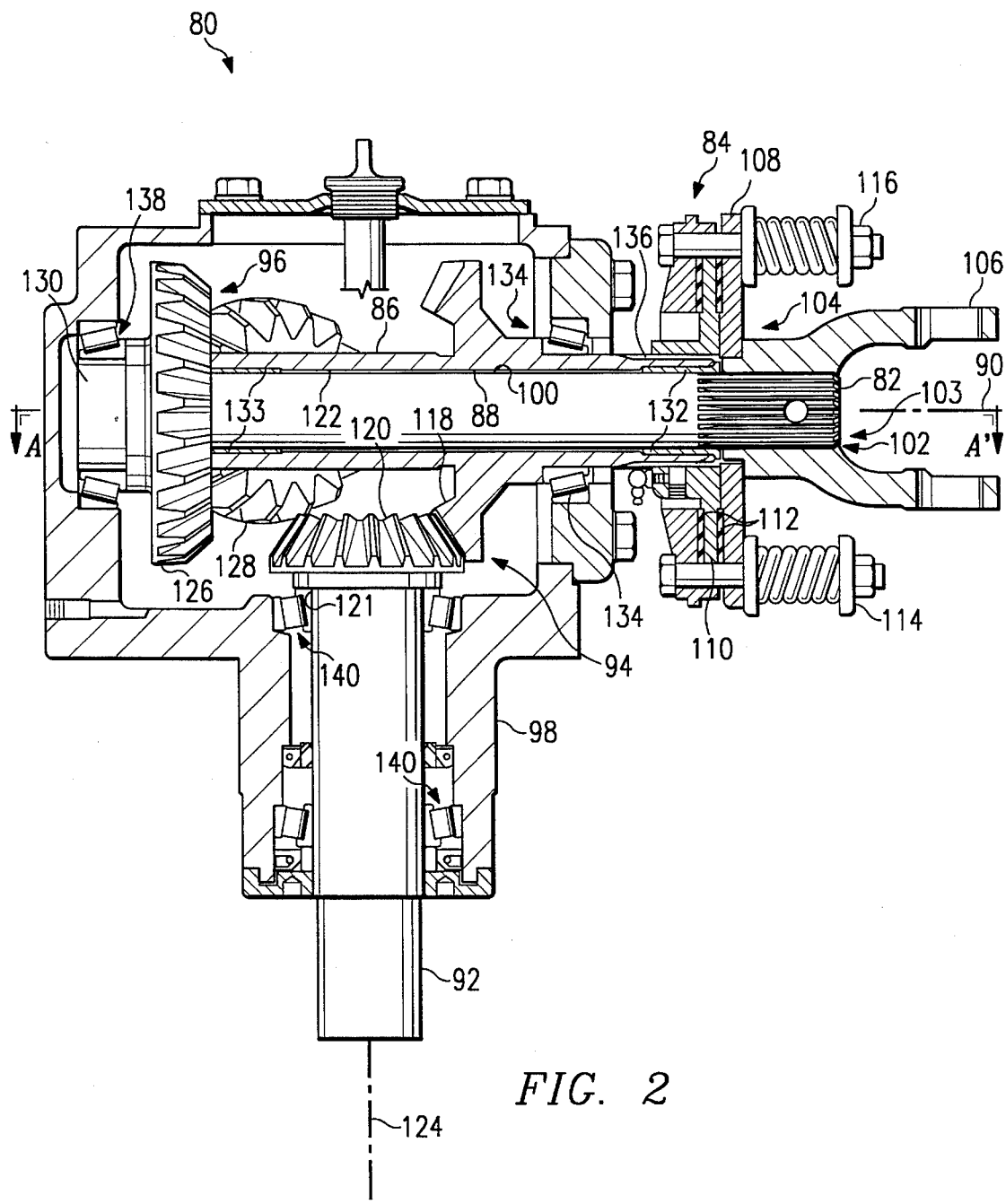
FIG. 2 is a sectional view of a rotary machinery system configured in accordance with a second embodiment of the present invention.

Turning now to FIG. 2, it shows a sectional view of a rotary machinery system configured in accordance with a second embodiment of the present invention. The rotary machinery system 80 includes an input shaft 82, clutch assembly 84, and a tubular shaft 86 having a hollow core 88. The input shaft 82 and the tubular shaft 86 are preferably coaxial and rotatable about a first axis 90.

The rotary machinery system further includes a first output shaft 92 coupled to the tubular shaft 86 by a first coupling means 94. The rotary machinery system 80 further includes a second coupling means 96 for coupling the input shaft 82 to a second output shaft, not visible in FIG. 2. The first coupling means 94 and the second coupling means 96 are enclosed in a gearbox 98. The rotary machinery system 80 may also include a third output shaft located in front of the gearbox 98 in FIG. 2. The third output shaft is not illustrated in FIG. 2 so as to not unduly complicate the drawing figure.

The input shaft 82 has an outer surface 100. At a first end 104 of the input shaft 82 a plurality of splines 102 are located on the outer surface 100 of the input shaft 82. The rotary machinery system 80 further includes an input yoke 106 having a plurality of splines 103 for engaging the splines 102 on the first end 104 of the input shaft 82.

The clutch assembly 84 includes an outer clutch plate 108, a center clutch plate 110, two friction disks 112, and torque adjustment assemblies 114 and 116. Thus, clutch assembly 84 forms a slip clutch for coupling the input shaft 82 and the tubular shaft 86 for transferring torque from the input shaft 82 to the tubular shaft 86. As will be understood by those skilled in the art, the rotary machinery system of the present invention could be advantageously used with other clutch assemblies including, but not limited to, a friction overload clutch, a friction throwout clutch, an overrunning clutch, other torque limiters and combinations thereof.

The first coupling means 94 includes a first gear 118 and a second gear 120. The first gear 118 is coupled to the outer surface 136 of the tubular shaft 86. The second gear 120 is coupled at an end 121 of the first output shaft 92. The second gear 120 intermeshes the first gear 118 for rotating the first output shaft 92 about a second axis 124.

The second coupling means 96 includes a third gear 126 and a fourth gear 128. The third gear 126 is coupled at a second end 130 of the input shaft 82. The fourth gear 128 rotatably engages the third gear 126 for rotating the second output shaft. In FIG. 2, the second output shaft is not visible but is located behind the gearbox 98, coaxial with the fourth gear 128.

The inner surface 122 of the tubular shaft 86 is separated from the outer surface 100 of the input shaft 82 by bearings 132 and 133. The outer surface 136 of the tubular shaft 86 is separated from the gearbox 98 by bearings 134. The second end 130 of the input shaft 82 is rotatably supported by the gearbox 98 through bearings 138. The first output shaft 92 is separated from the gearbox 98 by bearings 140. The bearings 132, 134, 138 and 140 prevent damage from relative motion of the input shaft 82, the tubular shaft 86, the first output shaft 92, the second output shaft and the gearbox 98.

Figure 3:
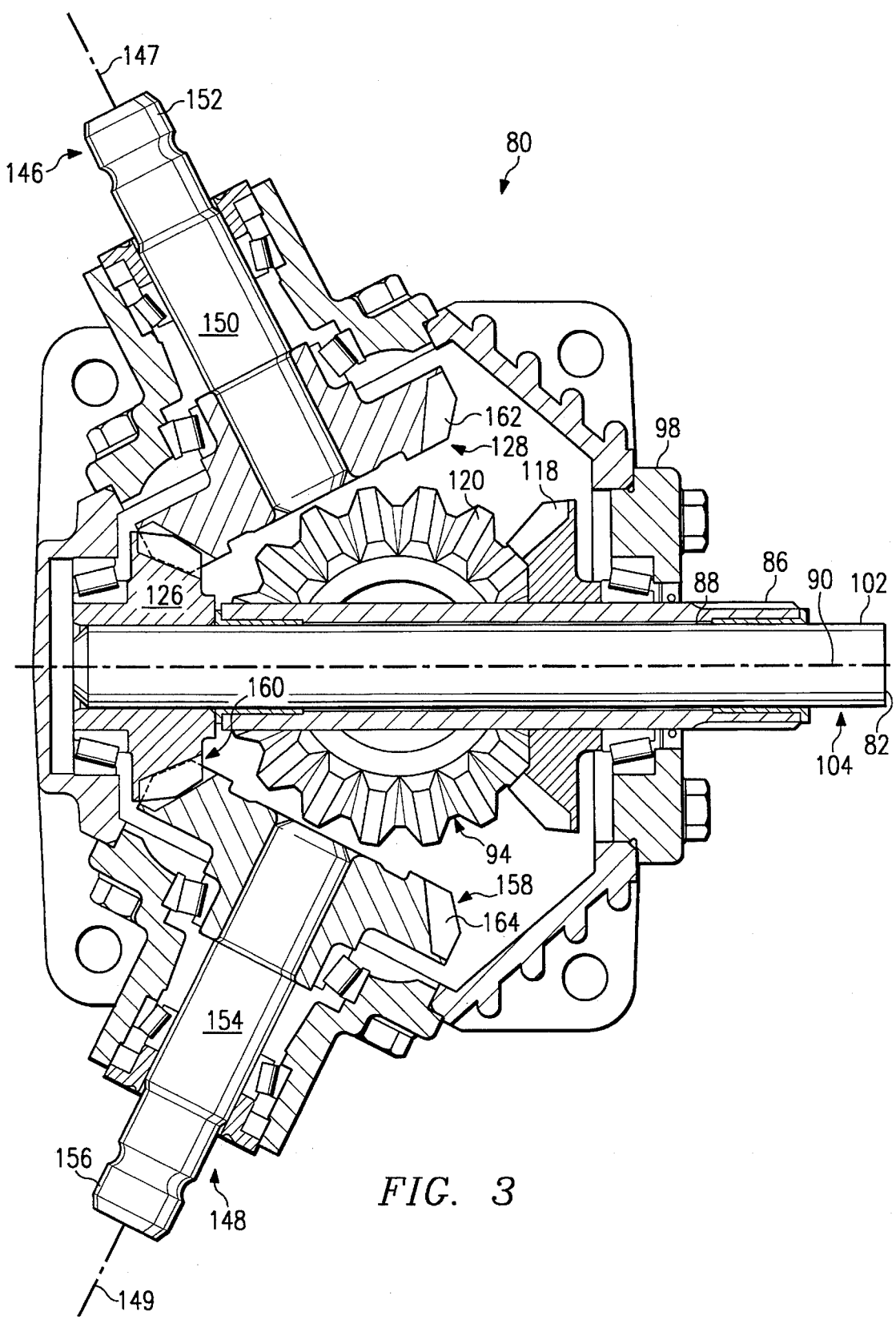
FIG. 3 is a sectional view taken along line A—A' of FIG. 2 of the rotary machinery system configured in accordance with the second embodiment of the present invention illustrated in FIG. 2.

Referring now to FIG. 3, it shows a sectional view taken along section A—A' of FIG. 2 of the rotary machinery system configured in accordance with the second embodiment of the present invention illustrated in FIG. 2. In FIG. 3, the clutch assembly 84 is omitted so as to not unduly complicate the drawing figure.

FIG. 3 illustrates the second output shaft 146 and a third output shaft 148 extending from the gearbox 98. The second output shaft 146 has a first end 150 and a second end 152. The second output shaft 146 is rotatable about an axis 147. The fourth gear 128 is coupled to the first end 150. The third output shaft 148 has a first end 154 and a second end 156. The third output shaft 148 is rotatable about an axis 149. A fifth gear 158 is coupled to the first end 154.

The third gear 126 includes a set of teeth 160. The fourth gear 128 also includes a set of teeth 162, and the fifth gear 158 includes a set of teeth 164. The sets of teeth 162 and 164 intermesh the set of teeth 160 for rotating the second output shaft 146 and the third output shaft 148. The third gear 126 and the fifth gear 158 form a third coupling means for rotatably coupling the input shaft 82 to the third output shaft 148.

In operation of the second embodiment of the present invention, torque is transmitted from the input yoke 106 directly to the input shaft 82, coupled to the input yoke by splines 102. Torque is further transferred from the input shaft to the third gear 126 and to the fourth gear 128, to the second output shaft 146. Torque is still further transferred from the third gear 126 to the fifth gear 158 and to the third output shaft 148. The second output shaft 146 and the third output shaft 148 thus provide unclutched outputs. Further, in operation, torque is transferred from the input yoke to the outer clutch plate 108, to the center clutch plate 110 through the friction disk 112, and to the tubular shaft 86. The tubular shaft then transfers torque to the first gear 118, to the second gear 120 and to the first output shaft 92. The first output shaft 92 thus provides a clutched output.

Accordingly, one application for the rotary machinery system 80 would be in a rotary cutter where the input yoke 106 is driven by an engine or other drive means for providing rotary power. The first output shaft 92 drives a center cutting blade and the second output shaft 146 and the third output shaft 148 indirectly drive a second and a third cutting blade, respectively. In such an application, the first output shaft is protected by the clutch assembly 84, and may cease rotation if blocked or otherwise impeded, leaving the input shaft free to turn. In this manner, the second output shaft which powers the second cutting blade and the third output shaft which powers the third cutting blade can continue to rotate while the first output shaft is stopped.

As can be seen from the foregoing, the present invention provides a rotating machinery system having flexible clutch configuration. In accordance with a first embodiment, a clutch assembly is located opposite the input end of the rotating machinery system, reducing interference between the clutch assembly and the driving elements, reducing the size required for the rotating machinery system, and facilitating maintenance. In accordance with a second embodiment, both clutched and unclutched outputs are provided from a single input in a physically compact rotary machinery system.

While particular embodiments of the present invention have been shown and described, modifications may be made, and it is therefore intended to cover in the appended claims all such changes and modifications which fall within the true spirit and scope of the invention.

We claim:

1. A rotary machinery system comprising:
   a tubular shaft rotatable about a first axis and having a hollow core, said tubular shaft having a first end and a second end;
   a second shaft coaxial with said tubular shaft and rotatable in a first direction in response to an input torque about said first axis, at least a portion of said second shaft being located in said hollow core, said second shaft having an input end configured to receive said input torque and a transfer end;
   a clutch assembly coupling said first end of said tubular shaft to said transfer end of said second shaft for rotating said tubular shaft in said first direction responsive to rotation of said second shaft;
   an output shaft rotatable about a second axis; and
   coupling means for rotatably coupling said output shaft to said tubular shaft.

2. A rotary machinery system as defined in claim 1 wherein said clutch assembly comprises a center clutch plate coaxial with said tubular shaft and coupled to said first end of said tubular shaft, an outer clutch plate coaxial with said second shaft and coupled to said transfer end of said second shaft, and a friction disk for coupling said center clutch plate and said outer clutch plate.

3. A rotary machinery system as defined in claim 2 wherein said tubular shaft has a tubular shaft inner surface and an outer surface and wherein said outer clutch plate is coupled to said outer surface at said first end.

4. A rotary machinery system as defined in claim 3 wherein said second shaft has a second shaft outer surface and wherein the rotary machinery system further comprises bearing means for separating said second shaft outer surface from said tubular shaft inner surface.

5. A rotary machinery system as defined in claim 3 wherein said coupling means comprises a first gear having a first set of teeth, said first gear being coaxial with said tubular shaft and being rotatably coupled to said tubular shaft, and a second gear having a second set of teeth for intermeshing said first set of teeth, said second gear rotating responsive to rotation of said first gear, said output shaft being rotatably coupled to said second gear.

6. A rotary machinery system as defined in claim 5 wherein said second axis is normal to said first axis.

7. A rotary machinery system as defined in claim 5 further comprising housing means forming an enclosure for enclosing said first gear and said second gear, said housing means having a first aperture for receiving said first end of said tubular shaft, a second aperture for receiving said second end of said tubular shaft and a third aperture for receiving said output shaft.

8. A rotary machinery system as defined in claim 7 wherein said clutch assembly is outside said enclosure and adjacent said first aperture and wherein said input means is outside said enclosure adjacent said second aperture.

9. A rotary machinery system as defined in claim 1 wherein said clutch assembly transfers said input torque from said second shaft to said tubular shaft and decouples said second shaft and said tubular shaft when said input torque exceeds a predetermined threshold.

10. A rotary machinery system as defined in claim 1 wherein said clutch assembly comprises a slip clutch.

11. A rotary machinery system for converting rotation about a first axis to rotation about second, third and fourth axes, the system comprising:
   an input shaft adapted to be rotated in a first direction about said first axis;
   a tubular shaft having a hollow core for receiving at least a portion of said input shaft, said tubular shaft being rotatable in said first direction about said first axis responsive to rotation of said input shaft;
   a clutch assembly coupling said input shaft and said tubular shaft for transferring torque from said input shaft to said tubular shaft;
   a first output shaft rotatable about said second axis;
   first coupling means for rotatably coupling said tubular shaft to said first output shaft;
   a second output shaft rotatable about said third axis;
   second coupling means for rotatably coupling said input shaft to said second output shaft;
   a third output shaft rotatable about said fourth axis; and
   third coupling means for rotatably coupling said input shaft to said third output shaft.

12. A rotary machinery system as defined in claim 11 wherein said clutch assembly comprises an outer clutch plate coaxial with said input shaft and rotatably coupled to said input shaft, and wherein said clutch assembly comprises a center clutch plate coaxial with said tubular shaft and coupled to a first end of said tubular shaft, said center clutch plate and said outer clutch plate being frictionally coupled through a friction disk.

13. A rotary machinery system as defined in claim 12 wherein said tubular shaft comprises a tubular shaft inner surface and an outer surface, said center clutch plate being coupled to said outer surface for rotating said tubular shaft responsive to rotation of said outer clutch plate.

14. A rotary machinery system as defined in claim 13 wherein said input shaft has an input shaft outer surface and wherein the rotary machinery system further comprises bearing means for separating said tubular shaft inner surface from said input shaft outer surface.

15. A rotary machinery system as defined in claim 13 wherein said first coupling means comprises a first gear coaxial with said tubular shaft and rotatably coupled to said outer surface, said first gear having a first set of teeth.

16. A rotary machinery system as defined in claim 15 wherein said first output shaft has a first end, said first coupling means further comprising a second gear coupled to said first end of said first output shaft, said second gear having a second set of teeth for engaging said first set of teeth for rotating said first output shaft about said second axis responsive to rotation of said tubular shaft.

17. A rotary machinery system as defined in claim 16 wherein said second axis is normal to said first axis.

18. A rotary machinery system as defined in claim 11 wherein said input shaft has a first end and a second end, said outer clutch plate being coupled at said first end, and wherein said second coupling means comprises a third gear coaxial with said input shaft and rotatably coupled at said second end of said input shaft, said third gear having a third set of teeth.

19. A rotary machinery system as defined in claim 18 wherein said second output shaft has a first end, said second coupling means further comprising a fourth gear coupled to said first end of said second output shaft, said fourth gear having a fourth set of teeth for engaging said third set of teeth for rotating said second output shaft about said third axis responsive to rotation of said input shaft.

20. A rotary machinery system as defined in claim 19 wherein said third output shaft has a first end, said third coupling means further comprising a fifth gear coupled to said first end of said third output shaft, said fifth gear having a fifth set of teeth for engaging said third set of teeth for rotating said third output shaft about said fourth axis responsive to rotation of said input shaft.

21. A rotary machinery system as defined in claim 11 wherein said clutch assembly decouples said input shaft and said tubular shaft when said torque exceeds a predetermined threshold.

22. A rotary machinery system as defined in claim 21 wherein said clutch assembly comprises a slip clutch.

23. A rotary machinery system comprising:
   an inner shaft having a first end adapted for being rotated about a first axis in a first direction and a second end;
   a tubular outer shaft coaxial with said inner shaft and having a hollow core containing a portion of said inner shaft, said outer shaft having a first end and a second end;
   a clutch assembly including an outer clutch plate fixed to said inner shaft second end and a center clutch plate fixed to said outer shaft second end, said center clutch plate rotating in response to rotation of said outer clutch plate for rotating said outer shaft in said first direction;
   a first gear fixed to said outer shaft and coaxially rotatable with said outer shaft;
   a second gear rotatable about a second axis said second axis being disposed at an angle to said first axis, said second gear engaging said first gear and rotating in response to rotation of said first gear;

an output shaft having a first end fixed to said second gear and a second end, said output shaft being coaxial with said second gear; and an enclosure having a first aperture receiving said outer shaft first end and said inner shaft first end, a second aperture receiving said outer shaft second end and said inner shaft second end, and a third aperture receiving said output shaft second end.

24. A rotary machinery system as defined in claim 23 wherein said second axis is normal to said first axis.

25. A rotary machinery system as defined in claim 23 wherein said clutch assembly further comprises a friction disk in frictional engagement with said outer clutch plate and said center clutch plate for transferring torque from said outer clutch plate and said center clutch plate, said friction disk disengaging said outer clutch plate from said center clutch plate when said torque exceeds a predetermined threshold.

* * * * *